United States Patent [19]

Maeda

[11] Patent Number: 5,666,477
[45] Date of Patent: Sep. 9, 1997

[54] METHOD AND APPARATUS FOR SETTING GRAPH DEFINITION ITEMS IN GRAPH PROCESSING SYSTEM

[75] Inventor: Jun Maeda, Shizuoka, Japan

[73] Assignee: Fujitsu Limited, Kawasaki, Japan

[21] Appl. No.: 719,416

[22] Filed: Sep. 24, 1996

Related U.S. Application Data

[63] Continuation of Ser. No. 320,212, Oct. 11, 1994, abandoned.

[30] Foreign Application Priority Data

Jan. 4, 1994 [JP] Japan .................................. 6-000051

[51] Int. Cl.⁶ ...................................... G06T 11/20
[52] U.S. Cl. ............................... 345/440; 345/353
[58] Field of Search .......................... 395/140, 352–354, 395/356; 345/133, 134, 139–140, 146

[56] References Cited

U.S. PATENT DOCUMENTS

| | | | |
|---|---|---|---|
| 4,611,306 | 9/1986 | Crehan et al. ........................ | 395/156 |
| 4,813,013 | 3/1989 | Dunn ..................................... | 395/159 |
| 4,967,381 | 10/1990 | Lane et al. ........................ | 364/551.01 |
| 5,226,118 | 7/1993 | Baker et al. ........................ | 395/161 |
| 5,375,201 | 12/1994 | Davoust ............................. | 395/161 |
| 5,557,716 | 9/1996 | Oka et al. ........................... | 395/140 |
| 5,581,677 | 12/1996 | Myers et al. ....................... | 395/140 |
| 5,581,678 | 12/1996 | Kahn ................................... | 395/140 |

*Primary Examiner*—Joseph H. Feild
*Attorney, Agent, or Firm*—Staas & Halsey

[57] ABSTRACT

When setting of items to define a graph is requested through an information input section, a menu preparing section, which has an interactive editing function, inquires settable definition items of one of a plurality of graph generating sections, and prepares a menu for an interactive edition to set the settable definition items based on information on the settable definition items which is returned from the associated one of the graph generating sections.

15 Claims, 5 Drawing Sheets

METHOD AND APPARATUS FOR SETTING GRAPH DEFINITION ITEMS IN GRAPH PROCESSING SYSTEM

This application is a continuation of application Ser. No. 08/320,212, filed Oct. 11, 1994, now abandoned.

BACKGROUND OF THE INVENTION

1. Field of the Invention

The present invention relates to a graph processing system which prepares and displays graphs, and, more particularly, to a method and apparatus for setting graph definition items to define the appearance of a graph in an interactive manner, i.e., for newly setting graph definition items or changing the setting of old graph definition items in an interactive manner.

2. Description of the Related Art

Graphs or charts are used to express, for example, statistical numeric data in various fields. Recently, multifarious forms of graphs are available so that a user selectively uses one or more proper forms of graphs according to the purpose.

In this respect, it is demanded that graph processing systems aided by a computer or the like should be able to not only prepare and display multifarious forms of graphs but also easily set the fine appearance of each graph. It is therefore necessary to finely set many items to define the appearance or the like of each graph.

To set items to define the appearance or the like of a graph, i.e., to execute new setting or alteration of setting, the definition items are generally set using a menu system in an interactive manner. This requires the preparation of menus which allow the fine setting many definition items for the appearances or the like of individual graphs.

In a conventional graph processing system, definition items for individual graphs are held in a graph processing section graph by graph. Therefore, a menu-based interactive editing function exists for each graph, so that to newly set or change the definition items for the appearance or the like of a graph, the interactive editing function which matches with the form of that graph should be invoked.

In executing the graph processing of three types of graphs, a step-formed graph(hereinafter referred to "step graph"), a bar graph and a scatter graph, for example, those three types of graphs are prepared and displayed in a step graph preparing/display section, a bar graph preparing/display section and a scatter graph preparing/display section respectively. Likewise, there are three menu-based interactive editing functions for setting (newly setting or altering the setting of) the definition items for those three graphs, an interactive editing function for step graphs, an interactive editing function for bar graphs and an interactive editing function for scatter graphs, for the respective types of graphs.

In this case, interactive control for allowing an operator to perform an interactive input operation is commonly executed for the three types of graphs, but the menu-based interactive editing function and the graph preparing/display process are executed for each graph.

As mentioned above, the conventional graph processing system executes the menu-based interactive editing function and the graph preparing/display process graph by graph. To add a new graph processing function or add a new definition item for any graph for which a graph processing function already exists, therefore, a new interactive editing function should be added or the processing content of the associated interactive editing function should be altered. In this case, the memory capacity inevitably increases to hold information about the added or changed processing content.

SUMMARY OF THE INVENTION

It is therefore an object of the present invention to provide a method and apparatus for setting graph definition items in a graph processing system, which are able to finely set the definition items of each graph without incorporating an interactive editing function graph by graph and facilitate the addition of a new graph processing function or a new definition item.

A method and apparatus for setting graph definition items in a graph processing system according to the present invention are designed in such a manner that when setting (new setting or alteration of setting) of items to define a graph is requested, the method and apparatus inquire settable definition items of a graph generating section and prepare a menu for an interactive edition to set the settable definition items in an interactive manner based on information on the settable definition items which is returned from the graph generating section. Accordingly, it is possible to finely set the definition items of each graph without incorporating an interactive editing function graph by graph and facilitate the addition of a new graph processing function or a new definition item.

The graph definition item setting system in the graph processing system according to this invention has an information input section, a menu preparing section and first to third graph generating sections.

The information input section has an interactive control function for an operator to allow the operator to input information in an interactive manner.

The menu preparing section has an interactive editing function, inquires settable definition items of any one of the first to third graph generating sections when setting of items to define a graph is requested through the information input section, and prepares a menu for an interactive edition to set the settable definition items based on information on the settable definition items which is returned from that graph generating section.

In response to the inquiry, the graph generating section informs the menu preparing section of items constituting each graph and their currently set values. More specifically, the menu preparing section is informed of items constituting a graph, such as the types and colors of lines if the graph is a line graph or the colors of rectangular areas if the graph is a bar graph, and their currently set values.

The first, second and third graph generating sections respectively prepare and display graph data of a step graph, a bar graph and a scatter graph based on given data. Those first to third graph generating sections previously store settable definition items for the respective graphs to cope with the inquiry from the menu preparing section.

This system sets items to define a graph in the following procedures.

When setting of items to define a graph is requested through the information input section, the menu preparing section inquires settable definition items of one of the graph generating sections.

In response to this inquiry, the associated graph generating section returns the settable definition items, held therein, to the menu preparing section.

The menu preparing section prepares a menu for setting the settable definition items based on the information on the definition items returned from the associated one of the graph generating sections.

It is to be noted that in response to the item setting request, the graph generating sections return only settable definition items to the menu preparing section.

The graph generating sections may return settable definition items in an hierarchical form so that the menu preparing section prepares a hierarchical menu according to the hierarchical definition items. In this case, if common setting elements are grouped so that an interactive editing process is commonly used for each group, the processing in the menu preparing section can be executed efficiently.

In the graph definition item setting system in the graph processing system according to this invention, as described above, the menu preparing-section for allowing an operator to input information in an interactive manner calls definition items for each graph and their currently set values from the associated one of the graph generating sections and prepares a menu based on the informed definition items.

As each graph generating section holds only the items constituting an associated graph, therefore, the individual graph generating sections need not incorporate menus and menu-by-menu processes. It is possible to finely set definition items for each graph. Further, to add the graph processing function for a new graph or add a new definition item to any existing graph, it is unnecessary to add a new interactive editing function to the menu preparing section or correct the existing interactive editing function.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First Embodiment

Figure 1:
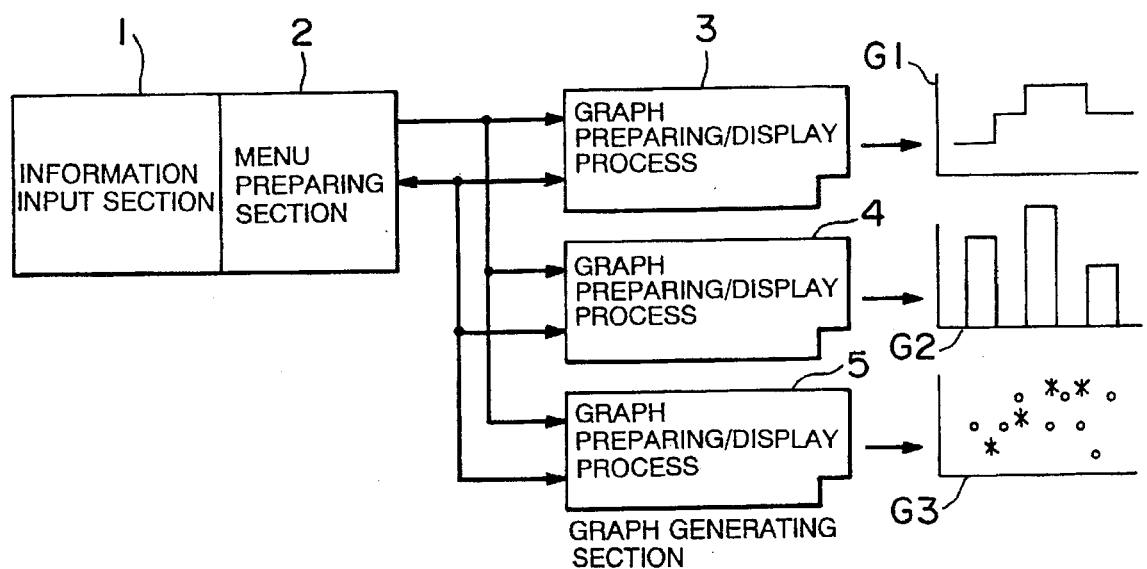
FIG. 1 is a block diagram exemplarily illustrating the structure of a principle graph processing system according to a first embodiment of the present invention.

FIG. 1 illustrates the structure of a graph processing system incorporating a principle system of setting graph definition items according to a first embodiment of the present invention.

The graph processing system embodying the present invention uses a common interactive editing function and is designed in such a way that when setting of items to define a graph, i.e., new setting or alteration of setting of definition items, is requested, the graph processing system inquires settable definition items of graph generating sections, provided for respective graph forms, and prepares a menu for an interactive edition to set the settable definition items in an interactive manner based on information on the settable definition items which is returned from one of the graph generating sections.

The graph processing system shown in FIG. 1 has an information input section 1, a menu preparing section 2 and first to third graph generating sections 3 to 5.

The information input section 1 has an interactive control function for an operator to allow the operator to input information in an interactive manner.

The first, second and third graph generating sections 3 to 5 respectively prepare and display graph data of a step graph G1, a bar graph G2 and a scatter graph G3 based on given data.

The menu preparing section 2 has an interactive editing function. When setting of items to define a graph (new setting or alteration of setting) is requested through the information input section 1, the menu preparing section 2 inquires settable definition items of one of the first to third graph generating sections 3–5 which associated with the designated graph form, and prepares a menu for an interactive edition to set the settable definition items based on information on the settable definition items which is returned from the first, second or third graph generating section 3, 4 or 5.

In response to the inquiry, the graph generating section 3, 4 or 5 informs the menu preparing section 2 of definition items constituting each graph and their currently set values. More specifically, the menu preparing section 2 is informed of items constituting a graph, e.g., the types and colors of lines if the graph is a line graph or the colors of rectangular areas if the graph is a bar graph, as the definition items, and their currently set values.

The first to third graph generating sections 3 to 5 previously store settable definition items for the respective graphs G1 to G3 to cope with the inquiry from the menu preparing section 2.

The graph processing system in FIG. 1 sets items to define a graph in the following steps.

(1) When setting (new setting or alteration of setting) of items to define a graph is requested through the information input section 1, the menu preparing section 2 inquires settable definition items of one of the graph generating sections 3–5.

(2) In response to this inquiry, the associated one of the graph generating sections 3–5 returns the settable definition items, held therein, to the menu preparing section 2.

(3) The menu preparing section 3 prepares a menu for setting the settable definition items based on the information on the definition items returned from the associated graph generating section 3, 4 or 5.

It is to be noted that in response to the item setting request, the graph generating sections 3–5 return only settable definition items and their currently set values to the menu preparing section 2.

The graph generating sections 3–5 may return settable definition items in an hierarchical form so that the menu preparing section 2 prepares a hierarchical menu according to the hierarchical definition items. In this case, if common setting elements are grouped so that an interactive editing process is commonly used for each group, the processing in the menu preparing section 2 can be executed more efficiently.

In the graph processing system in FIG. 1, the menu preparing section 2 for allowing an operator to input information in an interactive manner calls definition items for each graph and their currently set values from the associated one of the graph generating sections 3–5 and prepares a menu based on the obtained definition items.

As each of the graph generating sections 3–5 holds only the items constituting an associated graph, therefore, the individual graph generating sections 3–5 need not incorporate menus and menu-by-menu processes.

As apparent from the above description, it is possible to finely set definition items for each graph and it is unnecessary to add a new interactive editing function to the menu preparing section 2 or correct the existing interactive editing function in order to add the graph processing function for a new graph or add a new definition item to any existing graph.

Second Embodiment

Figure 2:
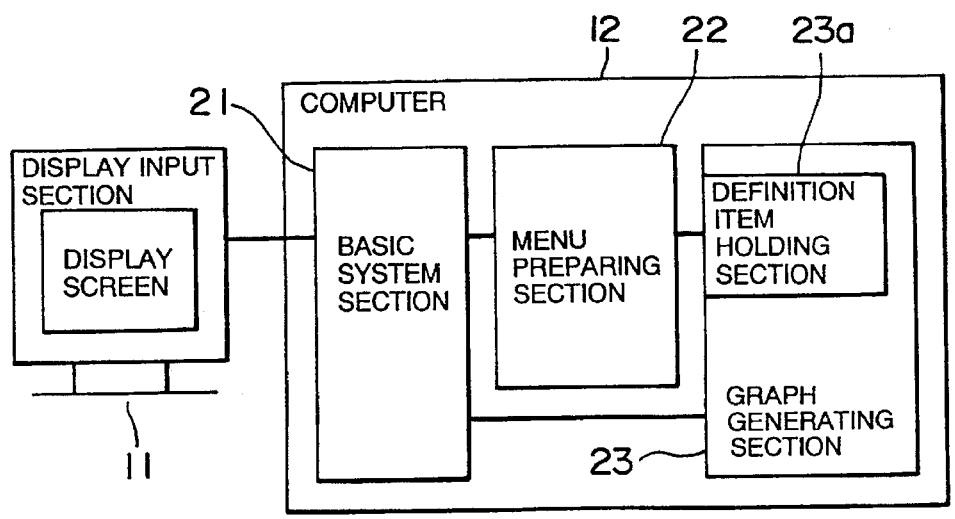
FIG. 2 is a block diagram showing the structure of a graph processing system according to a second embodiment of this invention.

FIG. 2 shows the structure of a graph processing system incorporating a system of setting graph definition items according to a second embodiment of this invention.

The graph processing system shown in FIG. 2 is the graph processing system in FIG. 1 which is designed more specifically.

The graph processing system shown in FIG. 2 comprises a display input section 11 and a computer 12.

The display input section 11 has a display, a keyboard and a pointing device all for an interactive operation to input information.

The computer 12 executes a graph preparing process. To execute this graph preparation, the computer 12 has a basic system section 21, a menu preparing section 22 and a graph generating section 23.

The basic system section 21 executes basic programs, such as an operating system and a windows system. The interactive control for allowing the operator to input information via the display input section 11 in an interactive manner is executed by this basic system section 21.

The graph generating section 23, which is the functional portion of a graph generating program, prepares and displays plural types of graph data based on given data. The graph generating section 23 has a definition item holding section 23a in which settable definition items for defining the appearances or the like of graphs are held graph by graph. The definition items of each graph are arranged in a hierarchical structure in accordance with the contents of the definitions, and are grouped in such a way that the items are commonly handled for common setting elements.

Data for preparing graph data that is given to this graph generating section 23 is extracted from, for example, a data base or is prepared by a so-called spreadsheet program.

The menu preparing section 22 is the functional portion of a menu preparing program. When setting of definition items for a graph is requested through the interactive operation by the operator, the menu preparing section 22 inquires settable definition items of the graph generating section 23, and prepare a menu for an interactive edition to set the settable definition items based on information on the settable definition items which is returned from the graph generating section 23. This menu preparing section prepares a hierarchical menu for the hierarchical definition items and prepares the same menu for the grouped and common setting elements.

The preparation/display of graphs and the alteration of the appearances of graphs in the graph processing system in FIG. 2 will now be discussed specifically.

Preparation/Display of Graphs

An operation for preparing/displaying graphs will now be described with reference to FIGS. 3 and 4.

Figure 3:
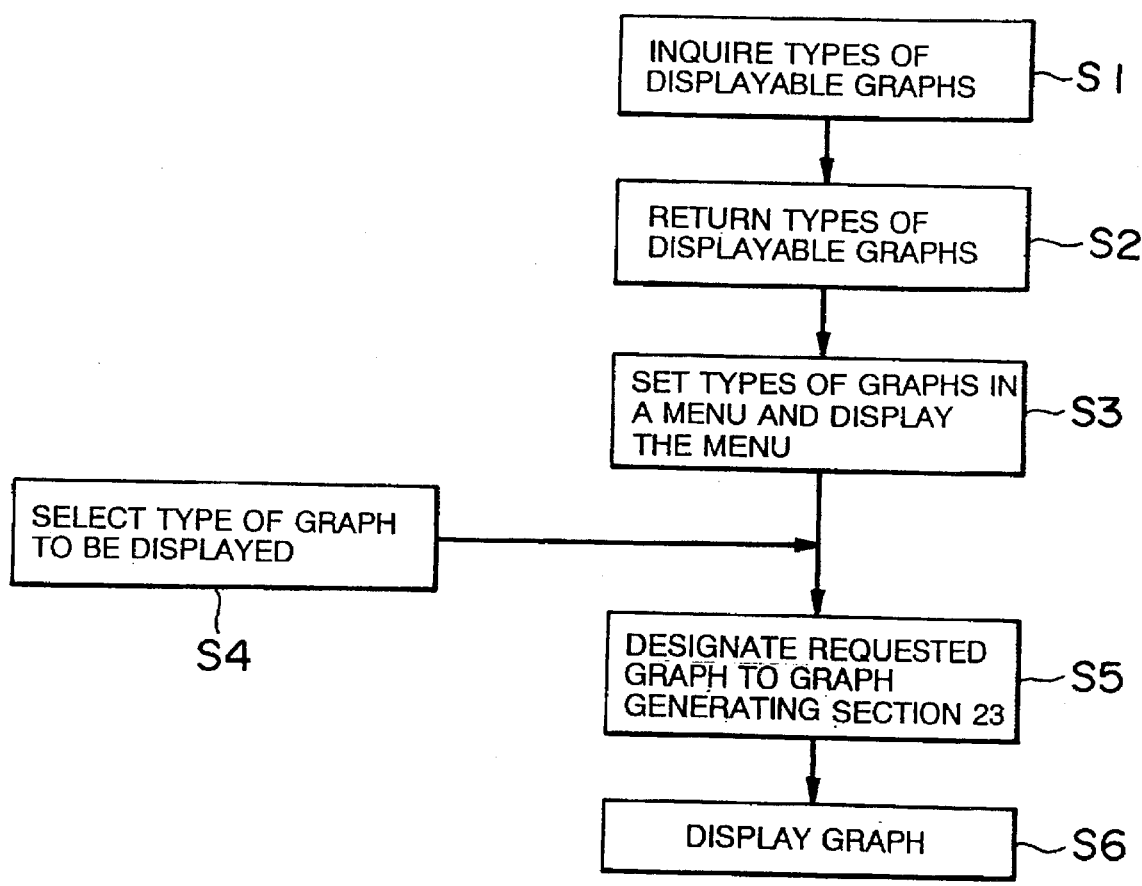
FIG. 3 is a flowchart for explaining the graph display process of the graph processing system shown in FIG. 2.
Figure 4:
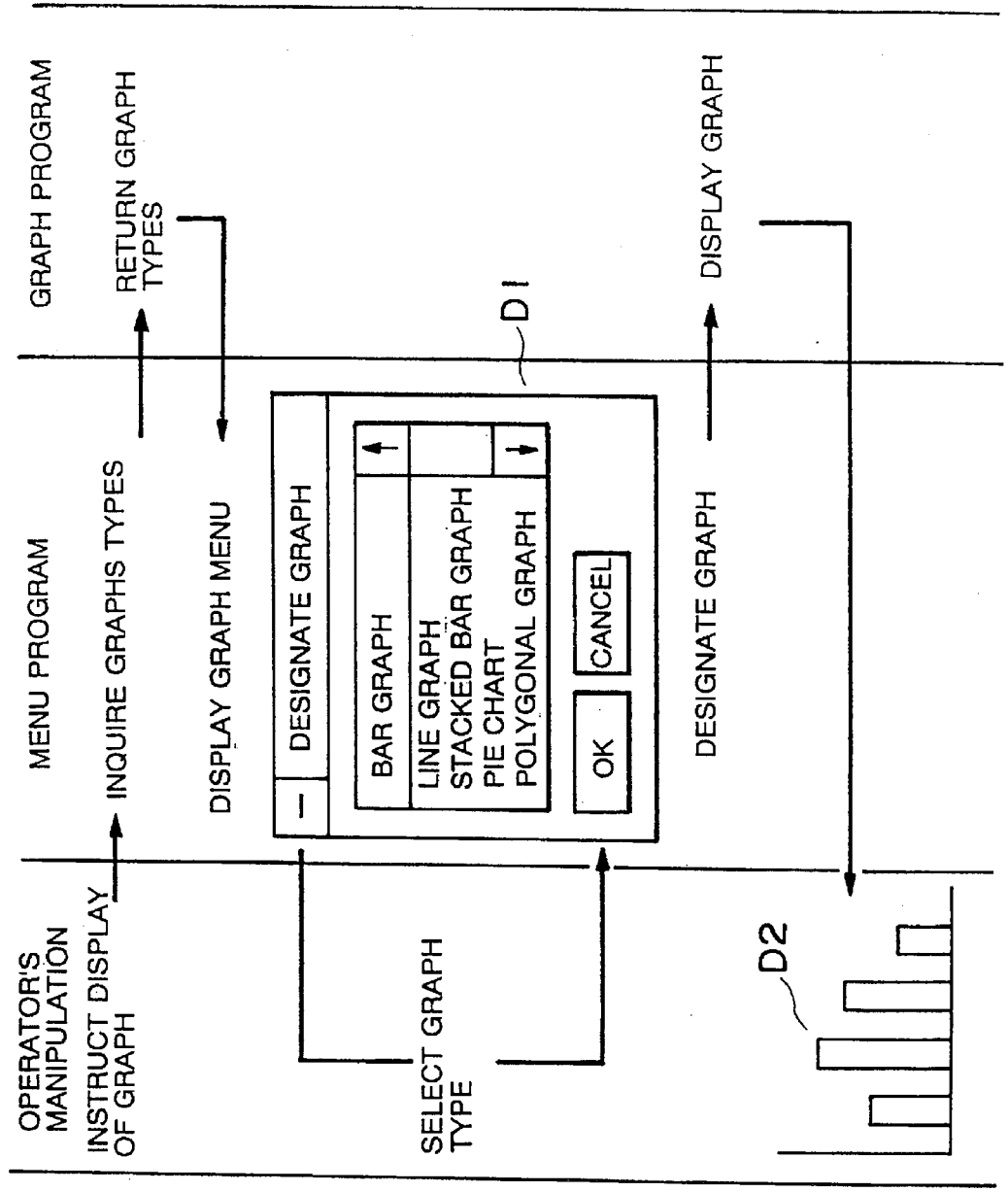
FIG. 4 is an exemplary diagram for explaining the graph display operation of the graph processing system shown in FIG. 2.

FIG. 3 illustrates a flowchart for the process which is associated with the graph preparation/display process, and FIG. 4 presents an exemplary diagram for the operation which is associated with the graph preparation/display process.

In FIG. 4, the operation of the display input section 11 by the operator is shown on the left-hand side, the process of the menu preparing section 22 by the menu program is shown on the center, and the process of the graph generating section 23 by the graph program is shown on the right-hand side to illustrate their mutual relation.

The preparation and display of graphs are executed as follows.

(1) Through the operator's manipulation, the menu preparing section 22 receives a graph display request from the display input section 11 via the basic system section 21.

(2) The menu program of the menu preparing section 22 inquires the types of displayable graphs of the graph generating section 23 (step S1). The graph program of the graph generating section 23 returns information on the types of the displayable graphs to the menu preparing section 22 (step S2). In this case, the graph generating section 23 holds the information on the types of displayable graphs in the definition item holding section 23a, and the graph program of the graph generating section 23 obtains the information on the types of displayable graphs from the definition item holding section 23a and returns the information to the menu preparing section 22.

(3) The menu program of the menu preparing section 22 sets the types of displayable graphs in a menu based on the information from the graph program, and displays the menu as shown in a display screen D1 in FIG. 4 (step S3).

(4) The operator operates the display input section 11 to select the type of a graph to be displayed (step S4). The selected information is given via the basic system section 21 to the menu preparing section 22.

(5) The menu program of the menu preparing section 22 designates the type of the graph, selected and requested by the operator, e.g., a bar graph, to the graph program of the graph generating section 23 (step S5).

(6) The graph program of the graph generating section 23 displays the graph of the requested type, a bar graph D2 in FIG. 4 (step S6).

Alteration of Appearance

An operation for changing the appearance of a graph will now be described with reference to FIGS. 5 and 6.

Figure 5:
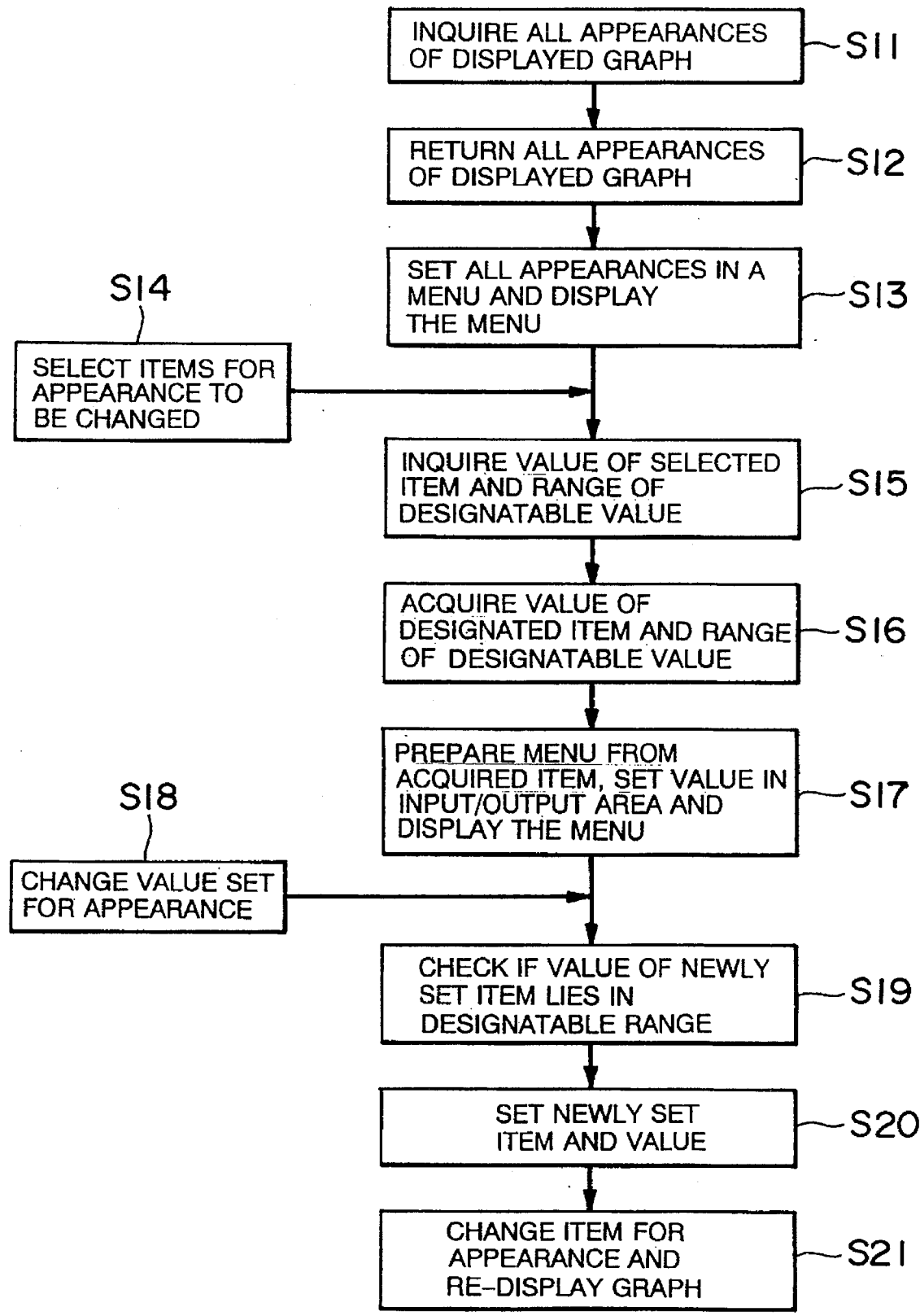
FIG. 5 is a flowchart for explaining a process of altering the appearance of a graph in the graph processing system shown in FIG. 2.
Figure 6:
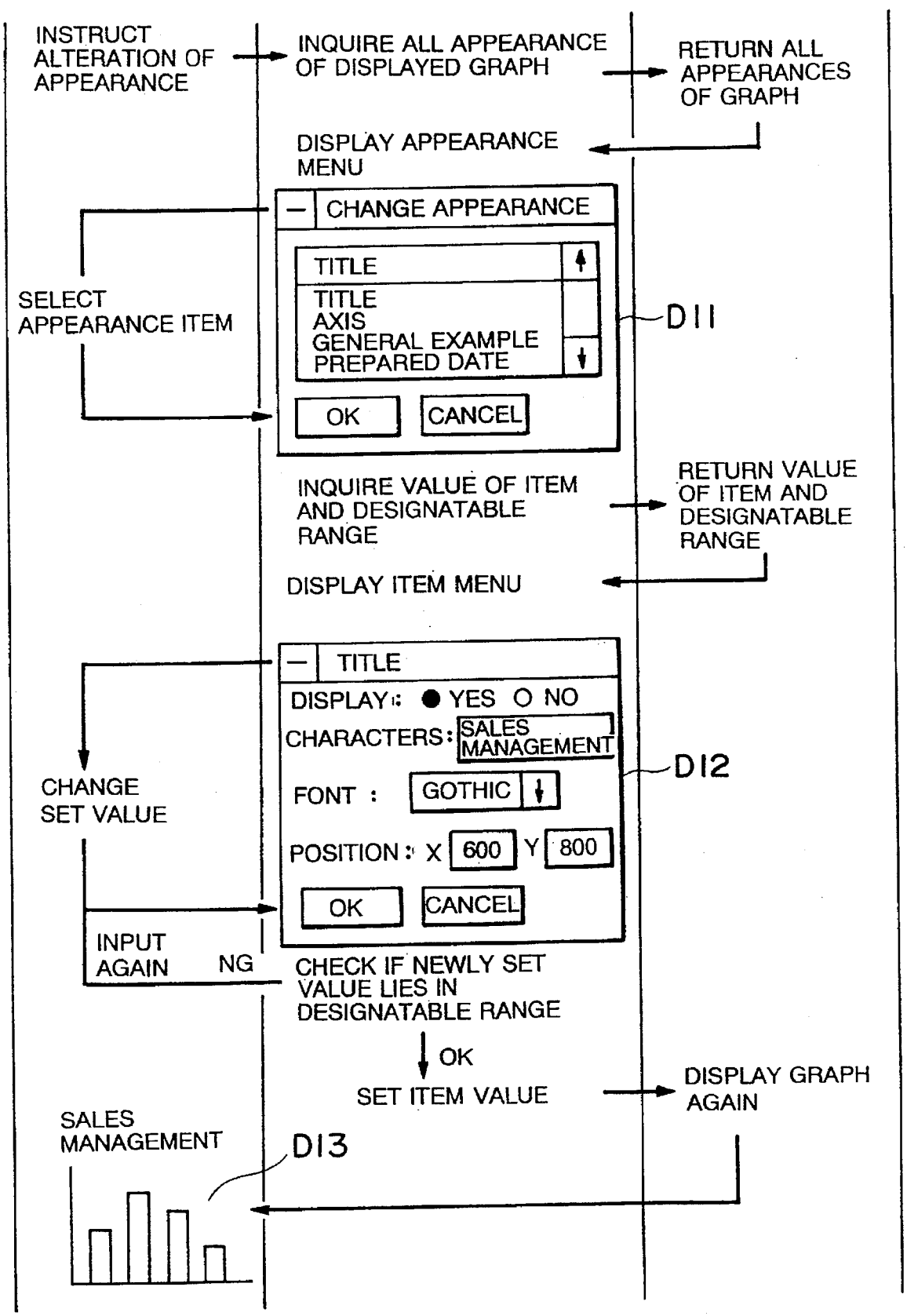
FIG. 6 is an exemplary diagram for explaining an operation of altering the appearance of a graph in the graph processing system shown in FIG. 2.

FIG. 5 shows a flowchart for the process which is associated with a process of altering the appearance of a graph, and FIG. 6 presents an exemplary diagram for the process which is associated with an operation of altering the appearance of a graph.

In FIG. 6, as in FIG. 4, the operation of the display input section 11 by the operator is shown on the left-hand side, the process of the menu preparing section 22 by the menu program is shown on the center, and the process of the graph generating section 23 by the graph program is shown on the right-hand side to illustrate their mutual relation.

The alteration of the appearance of a graph is executed as follows.

(1) Through the operator's manipulation, the menu preparing section 22 receives an appearance changing request from the display input section 11 via the basic system section 21.

(2) The menu program of the menu preparing section 22 inquires the definition items of all the appearances of the currently selected and displayed graph of the graph generating section 23 (step S11).

In this case, the graph generating section 23 holds the information on the definition items of all the appearances of this graph in the definition item holding section 23a, and the graph program of the graph generating section 23 obtains the information on the definition items of all the appearances of this graph from the definition item holding section 23a and returns this information to the menu preparing section 22 (step S12).

(3) The menu program of the menu preparing section 22 prepares a menu for displaying all the definition items obtained from the graph generating section 23 and selectively setting the definition items as needed, and displays the menu as shown in a display screen D11 in FIG. 6 (step S13).

(4) The operator operates the display input section 11 to select the definition items to be changed (step S14). The selected information is given via the basic system section 21 to the menu preparing section 22.

(5) The menu program of the menu preparing section 22 inquires the values of the selected definition items and the range of designatable values of the graph program of the graph generating section 23 (step St5). In this case, suppose that "title" is selected as a definition item. The graph program of the graph generating section 23 obtains the value of the selected definition item or "title" and the information of the range of the designatable value from the definition item holding section 23a, and returns the obtained information to the menu preparing section 22 (step S16).

(6) The menu program of the menu preparing section 22 prepares an item menu from the acquired information on the definition item, sets a value in the input/output area in the menu and displays the resultant menu as indicated by a display screen D12 in FIG. 6 (step S17).

(7) The operator manipulates the display input section 11 to change the value set for the appearance according to the menu (step S18). For example, the title is changed to "SALES MANAGEMENTS."

(8) The menu program of the menu preparing section 22 checks if the value of the newly set definition item falls within the designatable range (step S19), and gives the value of the newly set definition item to the graph program of the graph generating section 23 if this value lies in the designatable range (step S20).

If the value of the newly set definition item is out of the designatable range, the menu program informs the operator of an error and requests the operator to input a new value again.

(9) The graph program of the graph generating section 23 displays a bar graph D13, titled "SALES MANAGEMENT" as in FIG. 6, on the display input section 11 via the basic system section 21.

As apparent from the above, the definition items constituting each graph should only be held in the graph generating section 23 and the menu preparing section 22 has only to obtain the definition items from the graph generating section 23 to prepare the necessary menu. It is therefore unnecessary to incorporate menus and menu-by-menu processes in the menu preparing section 22. Accordingly, the process of altering the set information does not require many resources.

Even if the process for preparing/displaying a graph is extended, it is necessary to add only the definition items to be held in the definition item holding section 23a of the graph generating section 23 and the process of the interactive editing function of the menu preparing section 22 need not be changed at all.

In the graph processing system in FIG. 2, as described above, when setting of definition items to define a graph is requested, this system inquires settable definition items of the graph generating section 23 and prepares a menu for an interactive edition to set the settable definition items based on the information on the settable definition items which is returned from the graph generating section 23. Accordingly, it is possible to finely set the definition items of each graph without incorporating an interactive editing function graph by graph and facilitate the addition of a new graph processing function or a new definition item.

The definition items include the filling, the type of hatching, the plane color, the frame color, the type of the reference line, the color of the reference line, the width of the reference line, the presence/absence of a coupling line, the type of the coupling line, the color of the coupling line, and the width of the coupling line for a bar graph, and include the type of the line, the color of the line, the width of the line, the presence/absence of a marker, the type of the marker, the color of the marker, the filling, the type of hatching, the plane color, and the frame color for a line graph. As settable items differ graph by graph, the items that are returned to the menu preparing section 22 from the graph generating section 23 may be limited to those settable items for each graph, thus improving the efficiency of the process.

If there are many definition items, it is difficult to display all the items at a time and prepare a menu for setting the definition items. In this case, the definition items should be arranged in a hierarchical structure as mentioned earlier and the definition items for the next higher level should be acquired and be displayed in a menu after each selection. Since the selection of colors, the selection of line types, the selection of hatching, etc. are common to many definition items, the process can be simplified if the menu preparing section 22 uses a common display for the menu items, thus improving the operability of the menu selection.

The sharing of the display of menu items in the menu preparing section 22 may also be carried out for definition items corresponding to similar setting elements as well as for common definition items to make common processing as much as possible.

What is claimed is:

1. A method of setting graph definition items to define a graph in a graph processing system having a graph generating section for preparing and displaying graph data based on given data and an information input section for allowing an operator to input information to said graph generating section in an interactive manner, said method comprising the steps of:

requesting the settable graph definition items from the graph generating section by a common menu preparation section used by the graph generating section for generating a menu when setting of the settable graph definition items to define a graph is requested by an inquiry through the information input section;

returning the settable graph definition items from the graph generating section in response to the inquiry; and preparing a menu for setting the settable graph definition items by the common menu preparation section using the settable graph definition items returned from the graph generating section and common menu information.

2. The method according to claim 1, wherein said returning step returns only the settable graph definition items in response to the definition item setting inquiry.

3. The method according to claim 1, wherein said returning step returns the settable graph definition items in a hierarchical form, and said menu preparing step prepares a hierarchical menu in accordance with the settable graph definition items in hierarchical form.

4. The method according to claim 3, wherein the settable graph definition items in hierarchical form are grouped for common setting elements in said returning step and said menu preparing step.

5. An apparatus for setting graph definition items in a graph processing system, comprising:

informationinputmeansforallowinganoperatortoinput information in an interactive manner;

a plurality of graph generating means each for storing the settable graph definition items and preparing and displaying graph data based on given data; and common menu preparing means for requesting the settable graph definition items of at least one of said graph generating means when setting of the settable graph definition items to define a graph is requested through said information input means, and preparing a menu for interactive editing to set the settable graph definition items using the settable graph definition items requested from said graph generating means and common menu preparation information stored in said common menu preparing means.

6. The apparatus according to claim 5, wherein each of said graph generating means includes means for returning only the settable graph definition items in response to a request for the settable graph definition items from said common menu preparing means.

7. The apparatus according to claim 5, wherein each of said graph generating means includes means for returning the settable graph definition items in a hierarchical form in response to a request for the settable graph definition items from said common menu preparing means, and wherein said common menu preparing means includes means for preparing a hierarchical menu in accordance with the settable graph definition items in hierarchical form.

8. The apparatus according to claim 7, wherein said common menu preparing means includes means for preparing a common menu for common setting elements.

9. An apparatus for setting graph definition items in a graph processing system, comprising:

a display input section for providing a display output and allowing an operator to perform an input operation;

a graph generating section for storing the settable graph definition items, preparing graph data for each type of plural types of graphs based on given data, and displaying said graph data on said display input section;

a common menu preparing section to request the settable graph definition items from said graph generating section when setting of the settable graph definition items to define a graph is requested through said information input section, preparing a menu for interactive editing to set the settable graph definition items using the settable graph definition items requested from said graph generating section and common menu preparation information stored in said common menu preparing section, and to display the menu on said display input section.

10. The apparatus according to claim 9, wherein said graph generating section returns only the settable graph definition items in response to a request for the settable graph definition items from said common menu preparing section.

11. The apparatus according to claim 9, wherein said graph generating section includes means for returning the settable graph definition items in a hierarchical form in response to a request for the settable graph definition items from said common menu preparing means, and said common menu preparing means includes means for preparing a hierarchical menu in accordance with the settable graph definition items in hierarchical form.

12. The apparatus according to claim 11, wherein said common menu preparing means includes means for preparing a common menu for common setting elements.

13. A method for processing graph definition items in a computer, comprising the steps of:

(a) storing common menu preparation information used only by a common menu preparation module;

(b) storing settable graph definition items in a graph generating module;

(c) receiving the settable graph definition items by the common menu preparation module from the graph generating module; and, (d) generating a graph editing menu by the common menu preparation module using only the settable definition items received in step (c) and the common menu preparation information stored in step (a).

14. A graph processing system in a computer, comprising:

a memory to store common menu preparation data;

a plurality of graph generating units, each having modifiable graph definition items; and a common menu preparation unit using the modifiable graph definition items and the common menu preparation data to generate a graph editing menu when each of said plurality of graph generating units edits the modifiable graph definition items.

15. A graph processing system, comprising:

a memory to store common menu preparation data; and a processor to execute a plurality of graph generating modules and a common menu preparation module, each of the plurality of graph generating modules having modifiable graph definition items, and the common menu preparation module using the modifiable graph definition items and the common menu preparation data stored in said memory to generate a graph editing menu when each of said plurality of graph generating modules edits the modifiable graph definition items.

* * * * *